United States Patent [19]

Nakao

[11] Patent Number: 5,161,025
[45] Date of Patent: Nov. 3, 1992

[54] OPTICAL/ELECTRICAL VIEW FINDER

[75] Inventor: Souichiro Nakao, Tokyo, Japan

[73] Assignee: Fuji Photo Film Co., Ltd., Kanagawa, Japan

[21] Appl. No.: 631,852

[22] Filed: Dec. 21, 1990

[30] Foreign Application Priority Data

Dec. 28, 1989 [JP] Japan .................. 1-342461
Jun. 28, 1990 [JP] Japan .................. 2-170482
Oct. 26, 1990 [JP] Japan .................. 2-290552

[51] Int. Cl.⁵ .......................................... H04N 5/225
[52] U.S. Cl. ................................... 358/224; 358/906
[58] Field of Search ............... 358/209, 229, 909, 906, 358/213.13, 213.19, 335, 224, 225, 226, 55; 360/35.1

[56] References Cited

U.S. PATENT DOCUMENTS

| | | | |
|---|---|---|---|
| 4,330,797 | 5/1982 | Yokokawa et al. | 358/224 |
| 4,381,521 | 4/1983 | Iida et al. | 358/224 |
| 4,471,382 | 9/1984 | Toyoda et al. | 358/22 |
| 4,757,388 | 7/1988 | Someya et al. | 358/209 |
| 4,802,020 | 1/1989 | Miyake et al. | 358/909 |
| 4,849,819 | 7/1989 | Ishiguro et al. | 358/909 |
| 4,855,837 | 8/1989 | Tanimoto | 358/909 |
| 4,935,763 | 6/1990 | Itoh et al. | 358/227 |
| 4,949,117 | 8/1990 | Van Heyningen et al. | 358/224 |

FOREIGN PATENT DOCUMENTS

| | | | |
|---|---|---|---|
| 55-109080 | 8/1980 | Japan | 358/224 |
| 59-159141 | 9/1984 | Japan | 358/224 |

Primary Examiner—James J. Groody
Assistant Examiner—Mark R. Powell
Attorney, Agent, or Firm—Sughrue, Mion, Zinn, Macpeak & Seas

[57] ABSTRACT

A view finder is disclosed which uses an optical or frame-type view finder and an electronic view finder in combination. In the view finder, the image forming surface of the optical or frame-type view finder and the picture image surface of the electronic view finder are maintained in an optically equal distance relationship with respect to an eyepiece, so that both an optical image incident onto the optical or frame-type view finder and a display image displayed by the electronic view finder can be guided to the eyepiece through a half mirror. For this reason, either of the optical image incident onto the optical or frame-type view finder or the display image displayed by the electronic view finder can be viewed selectively, and also both images can be viewed in a hybrid state.

11 Claims, 20 Drawing Sheets

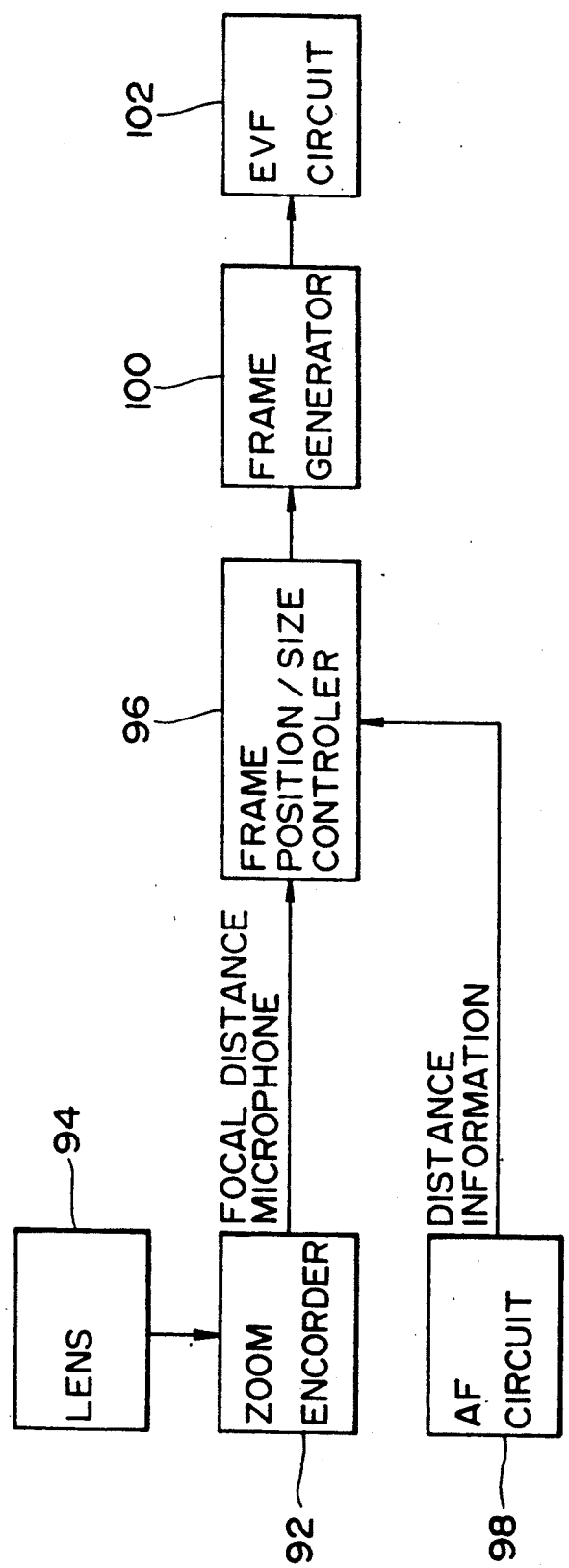

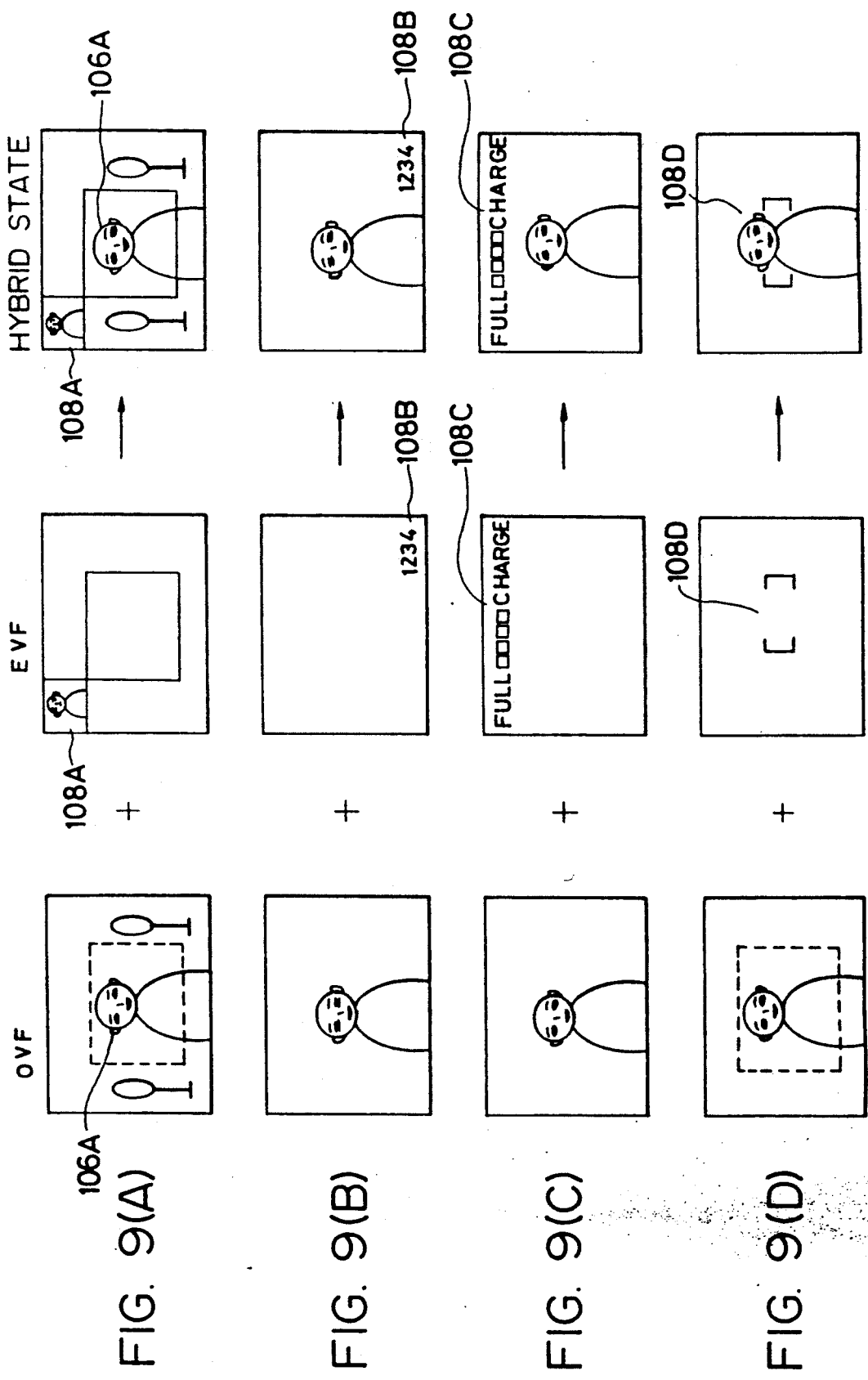

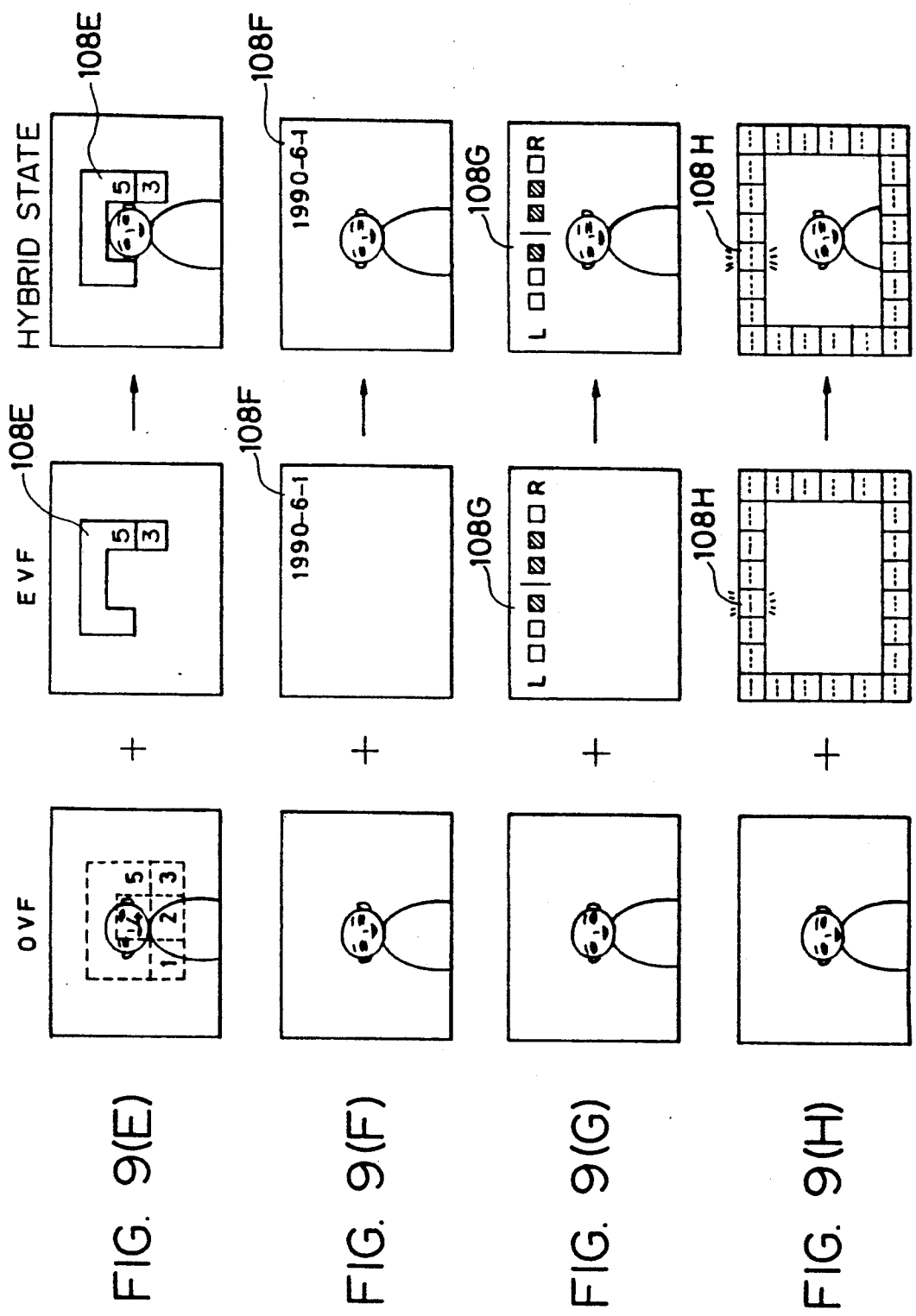

| 1-1 | 1-3 | 1-5 | 1-7 | 1-9 | 1-11 |
|---|---|---|---|---|---|
| 3-1 | 3-3 | 3-5 | 3-7 | 3-9 | 3-11 |
| 5-1 | 5-3 | 5-5 | 5-7 | 5-9 | 5-11 |
| 7-1 | 7-3 | 7-5 | 7-7 | 7-9 | 7-11 |
| 9-1 | 9-3 | 9-5 | 9-7 | 9-9 | 9-11 |
| 11-1 | 11-3 | 11-5 | 11-7 | 11-9 | 11-11 |
|  |  |  |  |  |  |

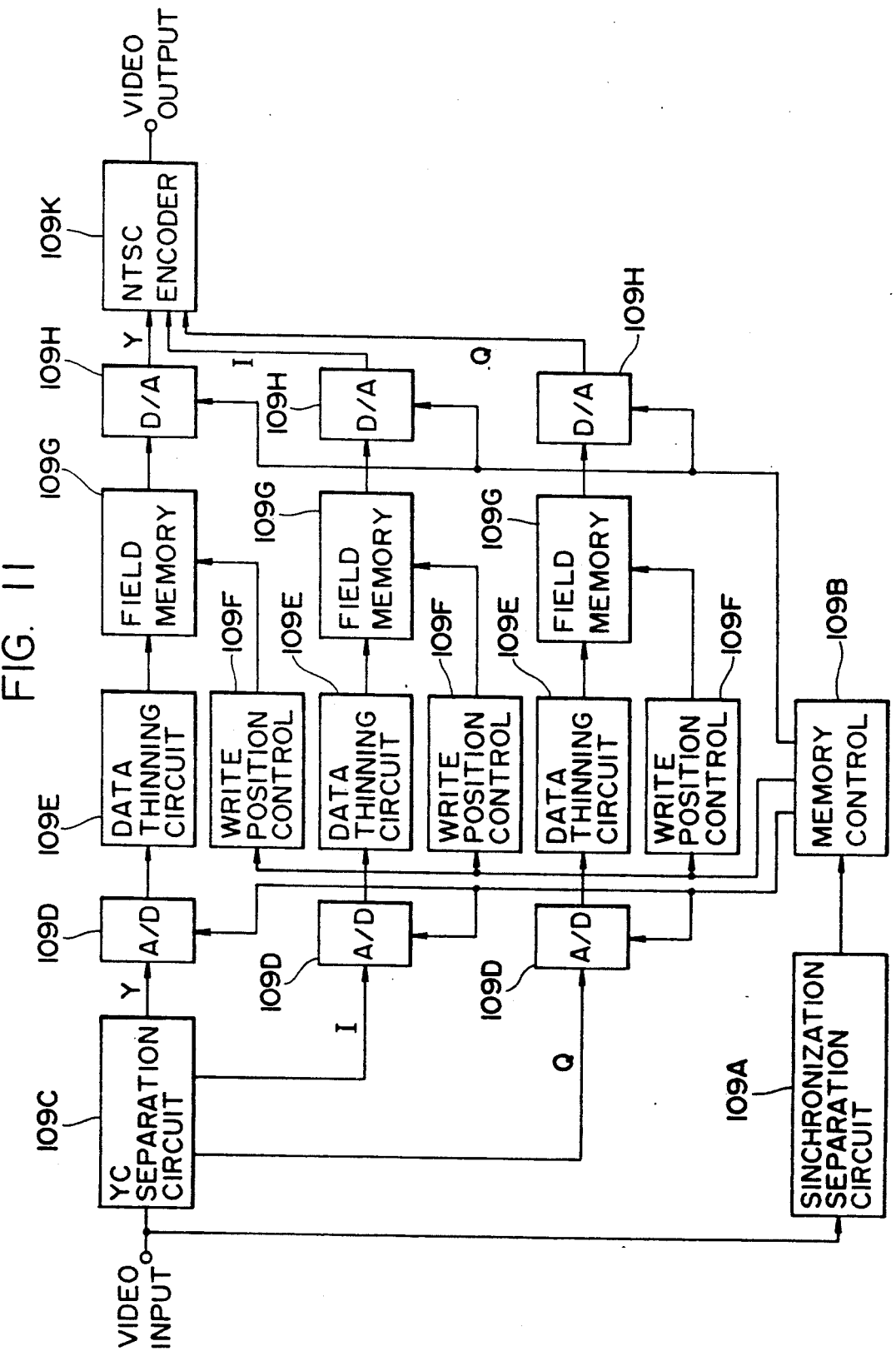

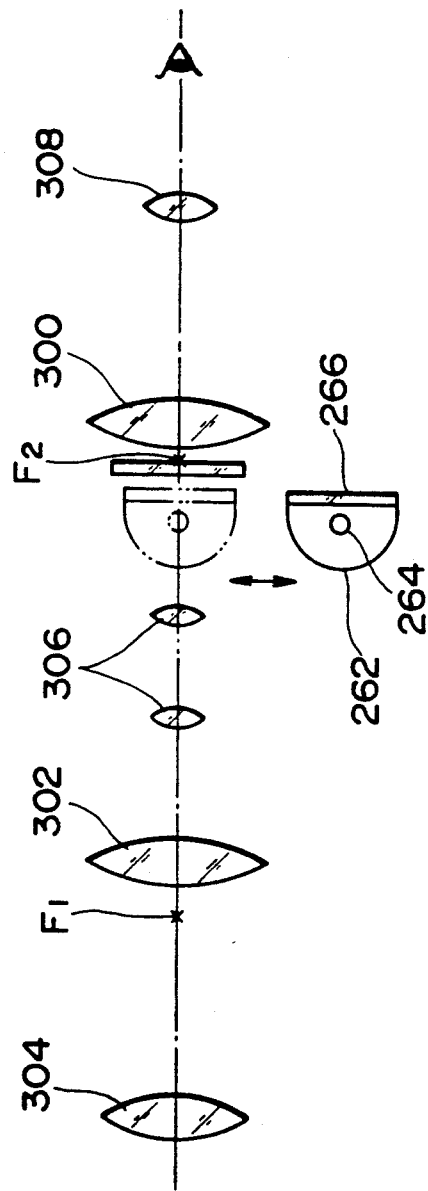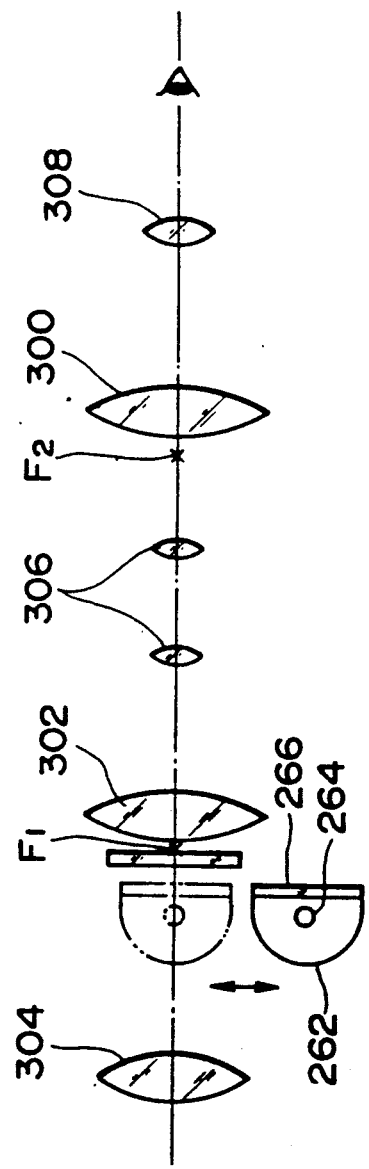

OPTICAL/ELECTRICAL VIEW FINDER

BACKGROUND OF THE INVENTION

1. Field of the Invention

The present invention relates to a view finder and, in particular, to a finder which is used in a video camera, an electronic still camera, a silver salt camera or the like.

2. Description of the Related Art

Conventionally, as a view finder for a home-use video camera, there has been used an optical view finder (which is hereinafter referred to as OVF). Also, in recent years, in place of the OVF, an electronic view finder (which is hereinafter referred to as EVF) has come into common use. That is because the EVF is advantageous over the OVF in that the EVF is able to monitor a video signal in other time than in photographing time and also is able to reproduce photographed picture images on the spot.

However, when compared with the OVF, the EVF has a disadvantage that it is not able to provide a clear picture image, which makes it difficult to photograph.

On the other hand, the OVF, if it is not a zoom-type OVF, has a problem in that a photographer is quite at a loss what place to photograph simply by looking in at the view finder when photographing by use of, for example, a zoom lens of high power.

SUMMARY OF THE INVENTION

The present invention aims at eliminating the drawbacks found in the above-mentioned prior art view finders.

Accordingly, it is an object of the invention to provide a view finder which is capable of surely obtaining a clear picture image in photographing while maintaining the merits of the EVF and also of indicating information on a photographing range and the like without using a zoom-type OVF.

In order to achieve the above object, according to one aspect of the invention, there is provided a view finder which comprises: an optical or frame-type view finder; an electronic view finder; and, an optical system for guiding through a half mirror to the eyes of a photographer an optical image entering the optical or frame-type view finder and a display image displayed by the electronic view finder, respectively.

In order to attain the above object, according to another aspect of the invention, there is provided a view finder for guiding through a half mirror to an eyepiece section an optical image entering an optical or frame-type view finder and a display image displayed by an electronic view finder respectively, said view finder comprising: a transmissive display means provided as the electronic view finder; and, a means for allowing entrance of an external light diffused from the back surface of the transmissive display means.

According to the invention, due to provision of an optical system which guides to an eyepiece an optical image entering from an objective lens of an OVF or a frame-type view finder as well as a display image displayed by an EVF, the optical image of the OVF or frame-type view finder and the display image of the EVF can be selected according to uses. That is, for example, in reproduction or monitoring, the image can be displayed by use of the EVF and, when a clear image is necessary, for example, in photographing or similar operations, the present view finder can be changed over to the OVF or frame-type view finder to thereby provide a clear picture image. Also, the photographing range can be indicated by use of the EVF.

Also, according to the invention, due to the fact that a diffused external light can be guided from the back surface of a transmissive display means to the transmissive display means by use of a means which allows entrance of a diffused external light, and the brightness of the display image of the transmissive display means can be set so as to be equal to the brightness of the optical image displayed on the OVF or the like, the display image can be displayed clearly on the view finder even when the display image of a liquid crystal display part is viewed in combination with the optical image.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 8 is a block diagram to display a picture frame for photographing on an EVF in a view finder according to the invention;

FIGS. 9(A) to (H) are respectively plan views to show states in which various kinds of information in a hybrid mode are displayed;

FIG. 11 is a block diagram of a circuit for creating a reduced video image;

DETAILED DESCRIPTION OF THE INVENTION

Detailed description will hereunder be given of the Preferred embodiments of a view finder according to the present invention with reference to the accompanying drawings.

Figure 1:
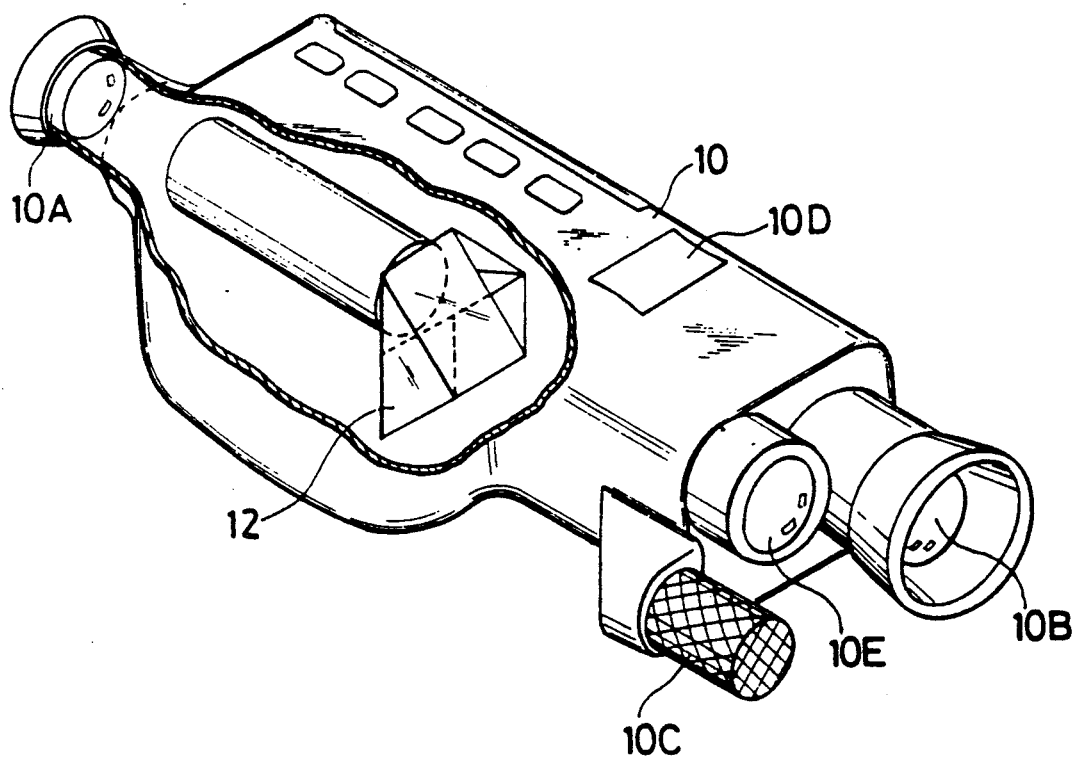
FIG. 1 is a perspective view of a camera incorporating therein a view finder according to the invention.
Figure 2:
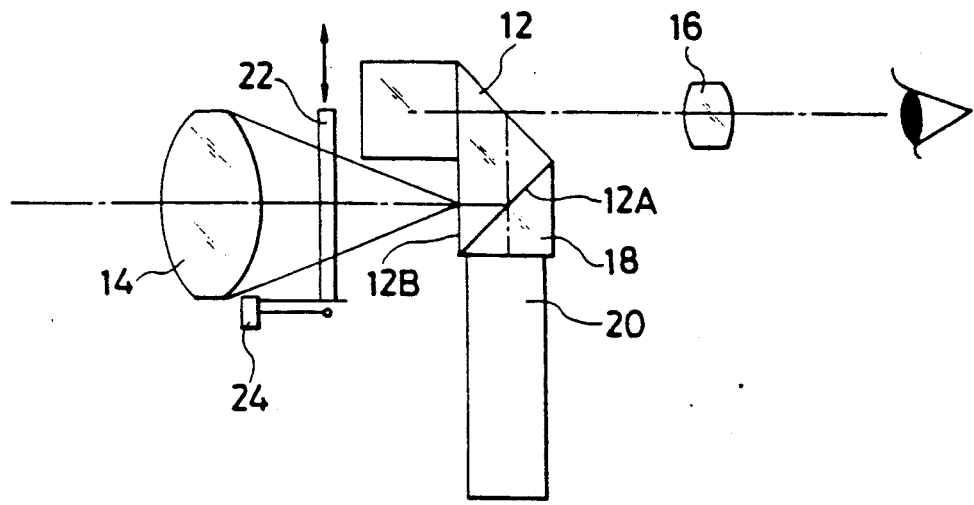
FIG. 2 is a general schematic view of an embodiment of a view finder according to the invention.

In FIG. 1, there is shown a perspective view of a video camera which incorporates therein a view finder according to the invention and, in FIG. 2, there is shown a general schematic view of an embodiment of a view finder according to the invention. The video camera, which is designated by a reference numeral 10, is a so called 8 mm video camera which includes a porro-prism 12 on the optical path of an OVF incorporated therein. The porro-prism 12 is adapted to reflect four times so as to form an erect image and, as shown in FIG. 2, it is interposed between an objective lens 14 and an eyepiece 16. In FIG. 1, reference character 10A designates a view finder, 10B stands for a taking lens, 10C expresses a microphone, 10D represents a motor-operated zoom button, and 10E indicates an objective lens of the OVF.

Also, the porro-prism 12 has one surface 12A which is machined in a half mirror shape. A prism 18 is disposed on the half mirror surface 12A. And, there is arranged an EVF 20 on the prism 18. The image surface of the thus arranged EVF 20 and the image forming surface of the objective lens 14 are arranged to keep therebetween a distance relation which is optically equal with respect to the eyepiece 16.

A mechanical shutter 22 is interposed between the primary image forming surface 12B of the porro-prism 12 and the objective lens 14 in such a manner that it can be moved in a vertical direction in FIG. 2. Below the mechanical shutter 22 there is provided an EVF switch 24. The EVF switch 24 is arranged in such a manner that, if the mechanical shutter 22 is moved downwardly to completely shield an optical path coming from the objective lens 14, then the switch piece of the EVF switch 24 is pushed by the lower end portion of the mechanical shutter 22 to turn on the EVF switch 24 to thereby allow the EVF 20 to conduct.

Therefore, when catching an object to be photographed by use of the OVF as in photographing or in similar operation, the mechanical shutter 22 is moved upwardly so as not to shield the optical path of the objective lens 14. This turns off the EVF switch 24, so that the object can be caught by means of the OVF. Also, in reproduction or monitoring, if the mechanical shutter 22 is moved downwardly to shield the optical path of the objective lens 14, then EVF switch 24 is turned on, so that the reproduction or monitoring can be achieved by way of the EVF.

In this case, the mechanical shutter 22 may be mounted at any position, provided that it is within the range of an optical path passing through the OVF and forwardly of the primary image forming surface 12B of the porro-prism 12.

Also, although in the above-mentioned embodiment the mechanical shutter 22 and EVF switch 24 are arranged such that they can be operated in link with each other, this is not limitative, but the EVF switch 24 and mechanical shutter 22 may be arranged such that they can be operated individually.

Figure 3:
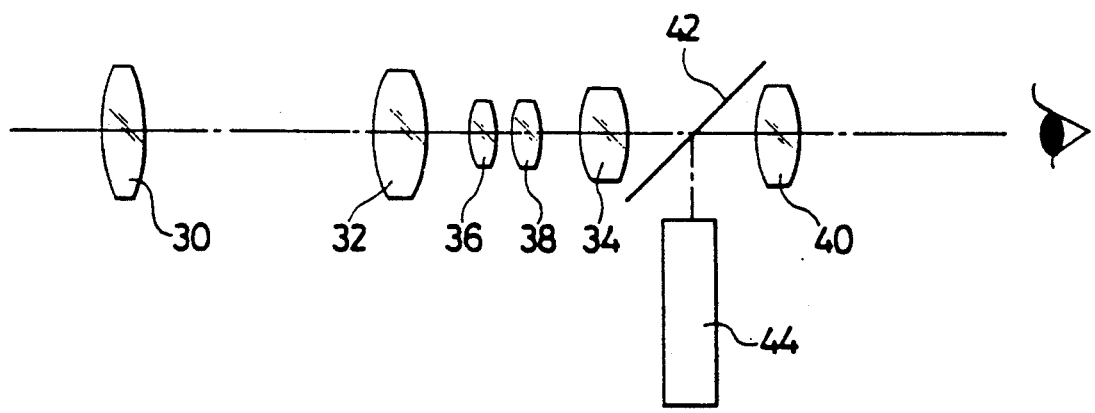
FIGS. 3 to 5 are respectively general schematic views of another embodiments of a view finder according to the invention.
Figure 4:
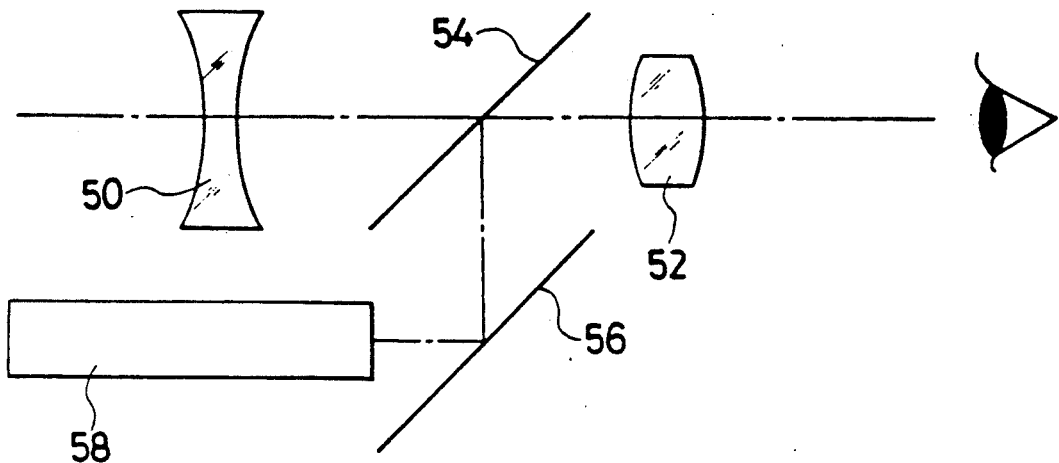

Further, in the above-mentioned embodiment, the porro-prism 12 is used to combine the OVF with the EVF. Such combination can also apply to other embodiments such as a relay lens type view finder shown in FIG. 3 and a reverse-Galilean type view finder shown in FIG. 4. Referring to FIG. 3, reference numeral 30 represents an objective lens, 32, 34 respectively stand for field lenses, 36, 38 respectively indicate relay lenses, 40 represents an eyepiece, 42 expresses a half mirror and 44 designates an EVF. Referring to FIG. 4, 50 designates an objective lens, 52 stands for an eyepiece, 54 represents a half mirror, 56 expresses a total reflection mirror, and 58 indicates an EVF.

Figure 5:
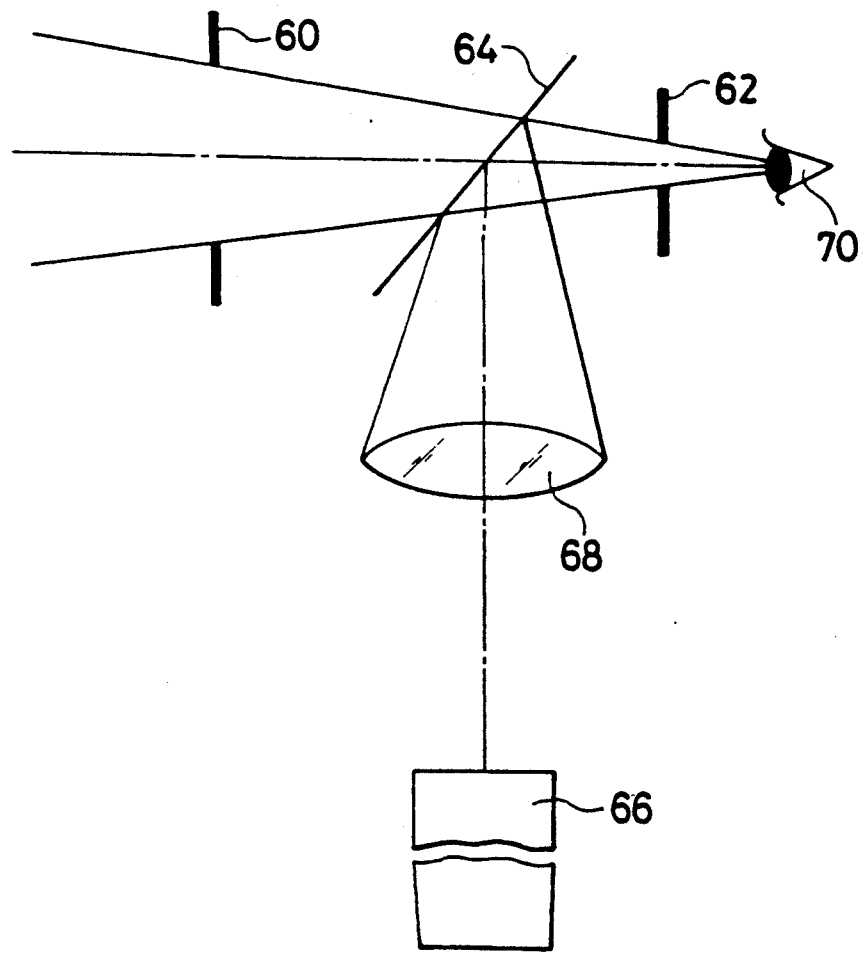

Although in the above-mentioned embodiment the EVF is mounted in the OVF, this is not limitative, but the EVF can be mounted in a view field frame type view finder, as shown in FIG. 5. In this case, between two field stops 60, 62 there is interposed a half mirror 64. An image on an EVF 66 is irradiated through a convex lens 68 on to the half mirror 64 and the irradiated image enters the eye 70 of a photographer through the field stop 62.

Also, in the above-mentioned embodiment, the mechanical shutter 22 is used, but the invention is not limited to this. For example, as shown in FIG. 6, a liquid crystal shutter 80 may be used.

Figure 6:
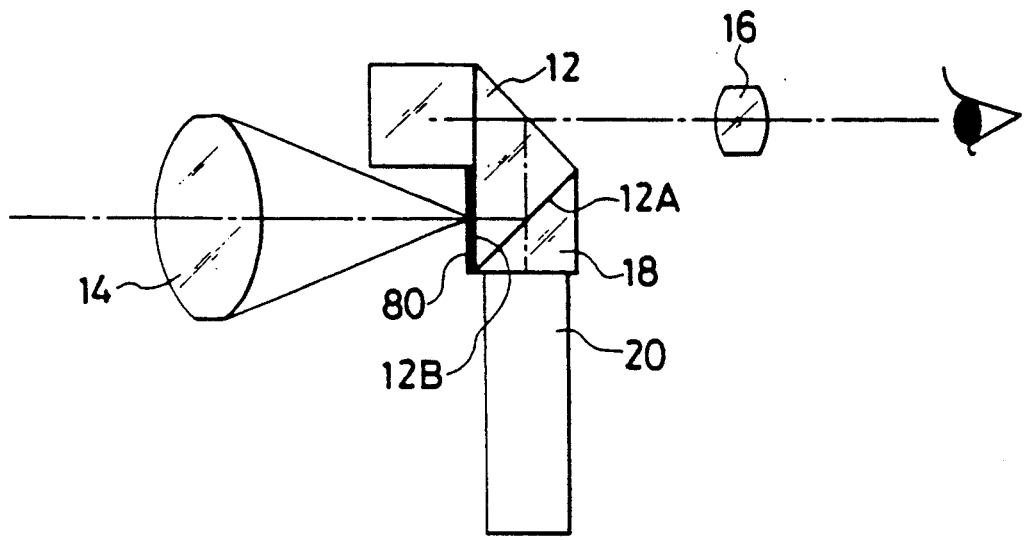
FIG. 6 is a general schematic view of another embodiment of a view finder according to the invention, in which a mechanical shutter used in the view finder shown in FIG. 2 is replaced by a liquid crystal shutter.

According to a view finder shown in FIG. 6 which uses the liquid crystal shutter 80, when an EVF is in use, the light of an OVF is shielded by the liquid crystal shutter 80 and the EVF is held in a conducting state, and when the OVF is in use, the light shielding by the liquid crystal shutter 80 is removed and the conduction of the EVF is removed. The power consumption of the liquid crystal shutter 80 can be saved if the shutter opening is exercised while it is conducting.

Although in FIG. 6 the liquid crystal shutter 80 is arranged on the primary image forming surface 12B of the porro-prism 12, this is not limitative, but the liquid crystal shutter 80 may be arranged at any position, provided it is within the range of an optical path passing through the OVF and in front of the primary image forming surface 12B.

Figure 7:
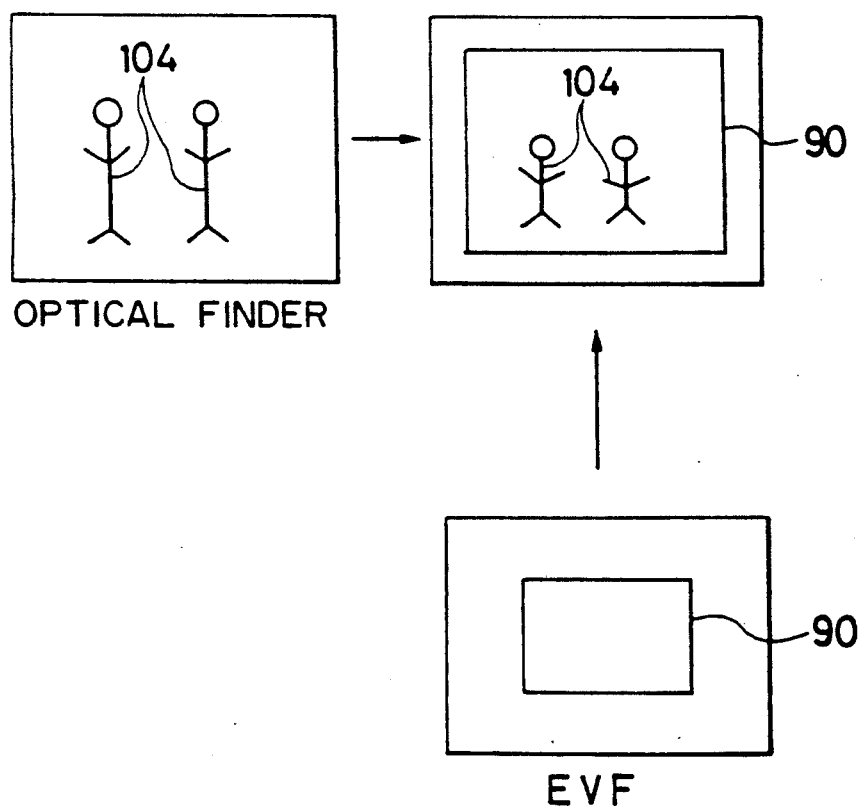
FIG. 7 is a plan view to show a state in which a picture frame for photographing is displayed in a view finder according to the invention.

Also, as shown in FIG. 7, a picture frame 90 can be displayed in the EVF. The picture frame 90 is arranged such that the size and position thereof can be adjusted. As shown in FIG. 8, the size of the picture frame 90 can be determined by a controller 96 in accordance with the focal distance of a taking lens 94 which can be obtained by a zoom encoder 92, while the position of the picture frame 90 can be determined by the controller 96 in accordance with the distance from a distance sensor to the object to be photographed obtained by an AF circuit 98 in a manner to correct a parallax. When the size and position of the picture frame 90 are determined, then a signal representing such determination is transmitted through a picture generator 10 to an EVF circuit 102 so that the picture frame 90 can be displayed on the EVF. Accordingly, a photographing range can be displayed clearly by means of an image 104 obtained by the OVF and the picture frame 90 obtained by the EVF, as shown in FIG. 7.

Further, in the above-mentioned hybrid mode, the EVF may be used to display various kinds of information as shown in FIG. 9. In FIG. 9(A), there is shown a state in which a TV picture photographed for confirmation of a REC (recording) condition is reduced and is displayed as an image 108A in the corner portion of the EVF. In this Figure, an image 106A is one which can be obtained by the OVF.

Figures 10A, 10B:
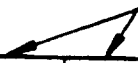
FIGS. 10(A) and (B) are respectively views to show original screen data and data for ¼-screen display.

Here, the reduced image will be described in detail. FIGS. 10 (A) and (B) respectively illustrate how to take data when the reduced image is displayed. In particular, FIG. 10 (A) shows the data of an original screen, in which (1—1), (1—2), for example, show sampling points. Also, in FIG. 10 (B), there are shown screen data obtained when original screen data are thinned out, for example, screen data for a quarter screen display.

Referring now to FIG. 11, there is shown a block diagram of a circuit used to create a reduced picture image. As shown in FIG. 11, a synchronization signal (which is hereinafter referred to as a sync signal), which is separated from a video input signal, is applied through a synchronization separation circuit 109A to a memory control 109B. On the other hand, the R, G, and B components of the video input signal are separated into a brightness signal (Y) and color signals (I, Q) by a Y C separation circuit 109C. The thus separated Y, I and Q signals are guided through A/D conversion circuits 109D, 109D and 109D to data thinning circuits 109E, 109E and 109E, respectively.

The above-mentioned data thinning circuits 109E, 109E and 109E are arranged to be able to thin out data in such a manner as shown in FIG. 10 (B). The thus thinned data are synchronized with the sync signals that are respectively applied through the memory control 109B and write position controls 109F, 109F and 109F to field memories 109G, 109G and 109G, and are also allotted to the predetermined Positions of the field memories 109G, 109G and 109G. And, these signals are output, as video signals, through D/A conversion circuits 109H, 109H and 109H and through an NTSC encoder 109K. In this manner, a reduced picture image can be created.

Also, FIG. 9(B) shows the display state of a counter 108B, FIG. 9(C) shows the display state of a battery remaining amount 108C, and FIG. 9(D) shows the display state of an AF measuring area 108D. The size of the AF measuring area is varied according to the focal distances of the taking lens.

Further, FIG. 9(E) shows the brightness state of the AE measuring area. In FIG. 9(E), broken lines illustrate a photographing range and a measuring area. The measuring area 108E, in which the measuring brightness goes under or over a predetermined level, will be displayed on and off. And, FIG. 9(F) shows the display of a photographing year, month and date 108F, that is, the state of a calendar display, and FIG. 9(G) shows the display state of the degree of a sound amount 108G. Further, FIG. 9(H) shows the display state of a title 108H. Here, all titles of titlers incorporated in a video camera are arranged on the outer sides of a screen in a frame and pre-set titles can be displayed on and off.

Figure 12:
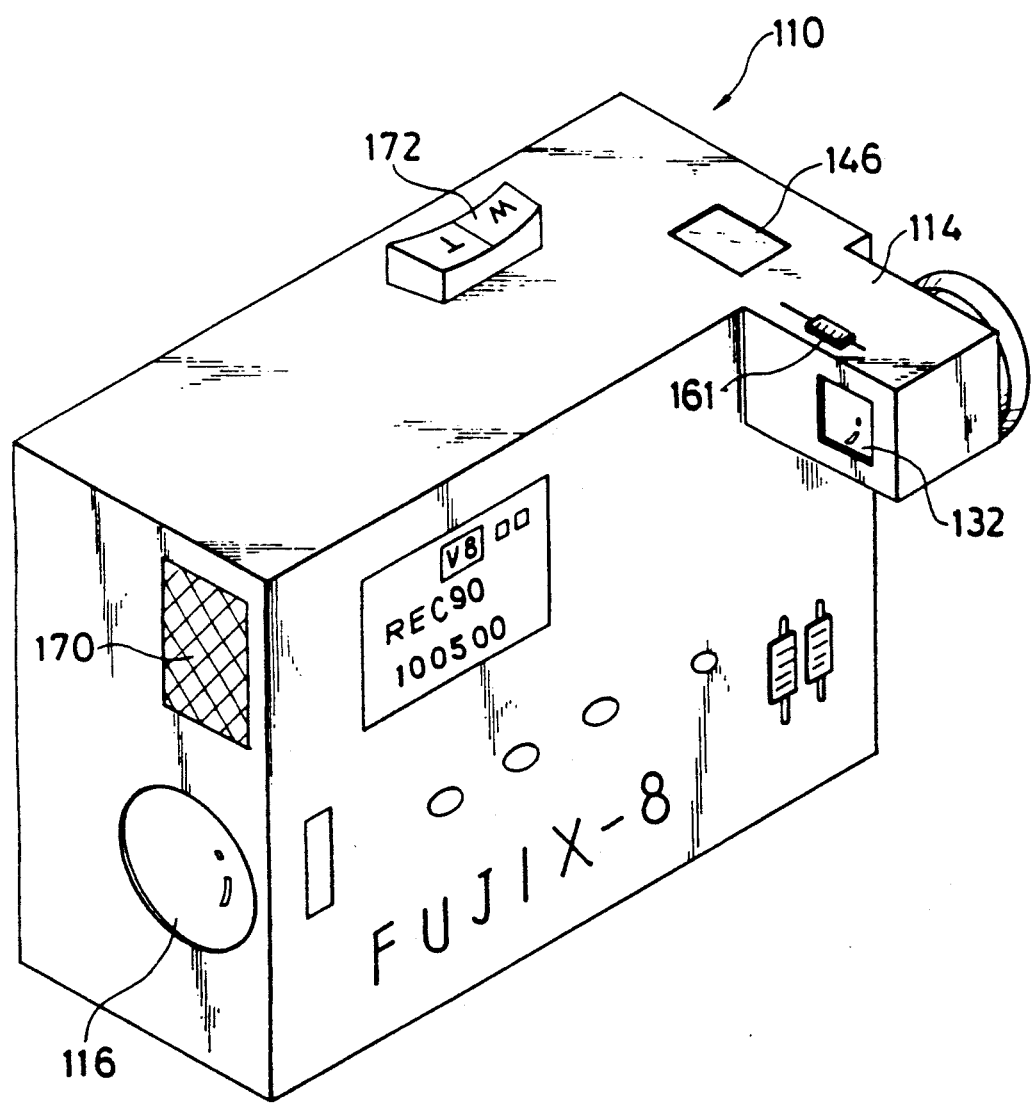
FIG. 12 is a perspective view of a video camera incorporating therein a view finder according to the invention.
Figure 13:
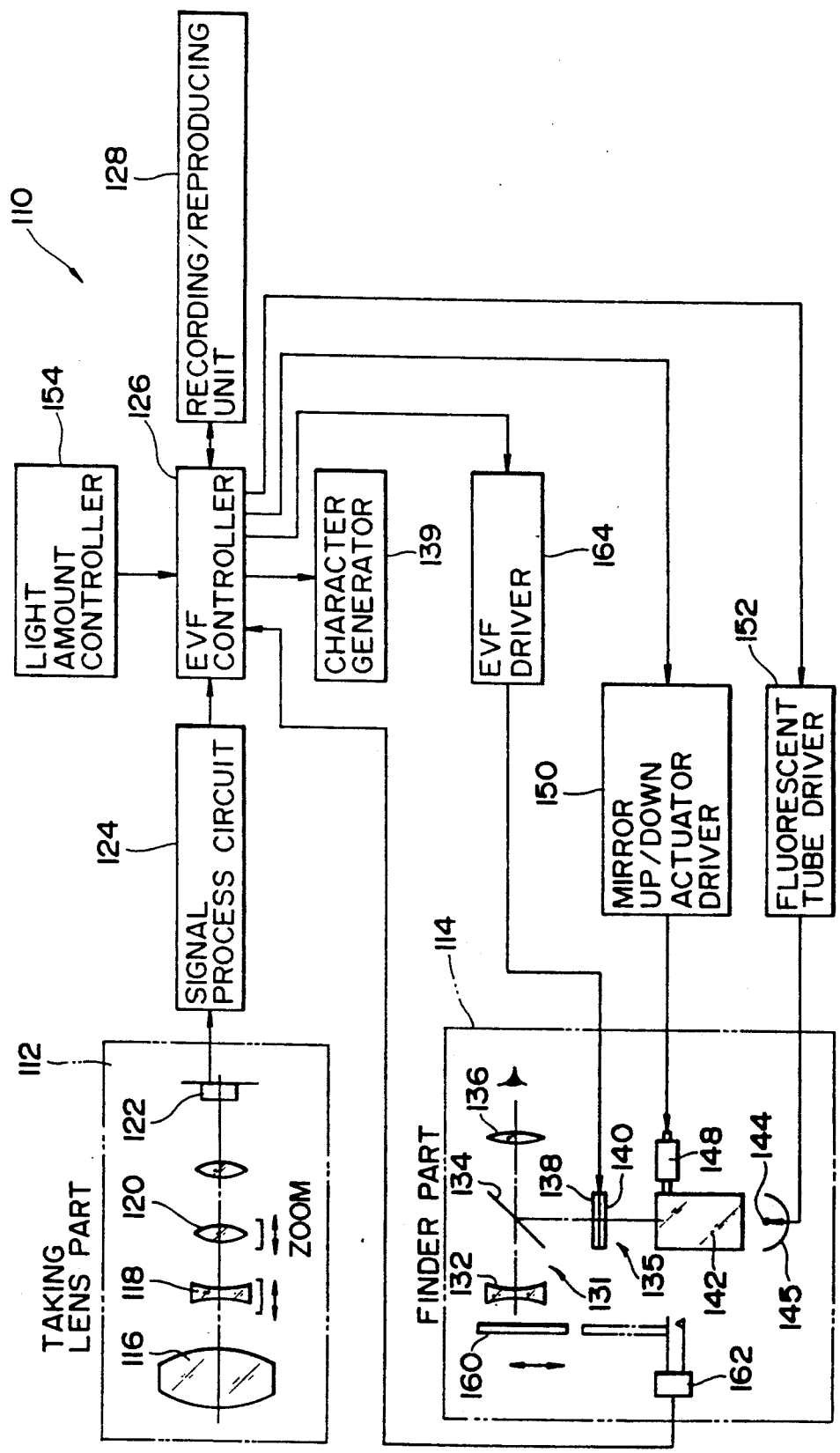
FIG. 13 is a schematic view of the video camera shown in FIG. 12.
Figure 14:
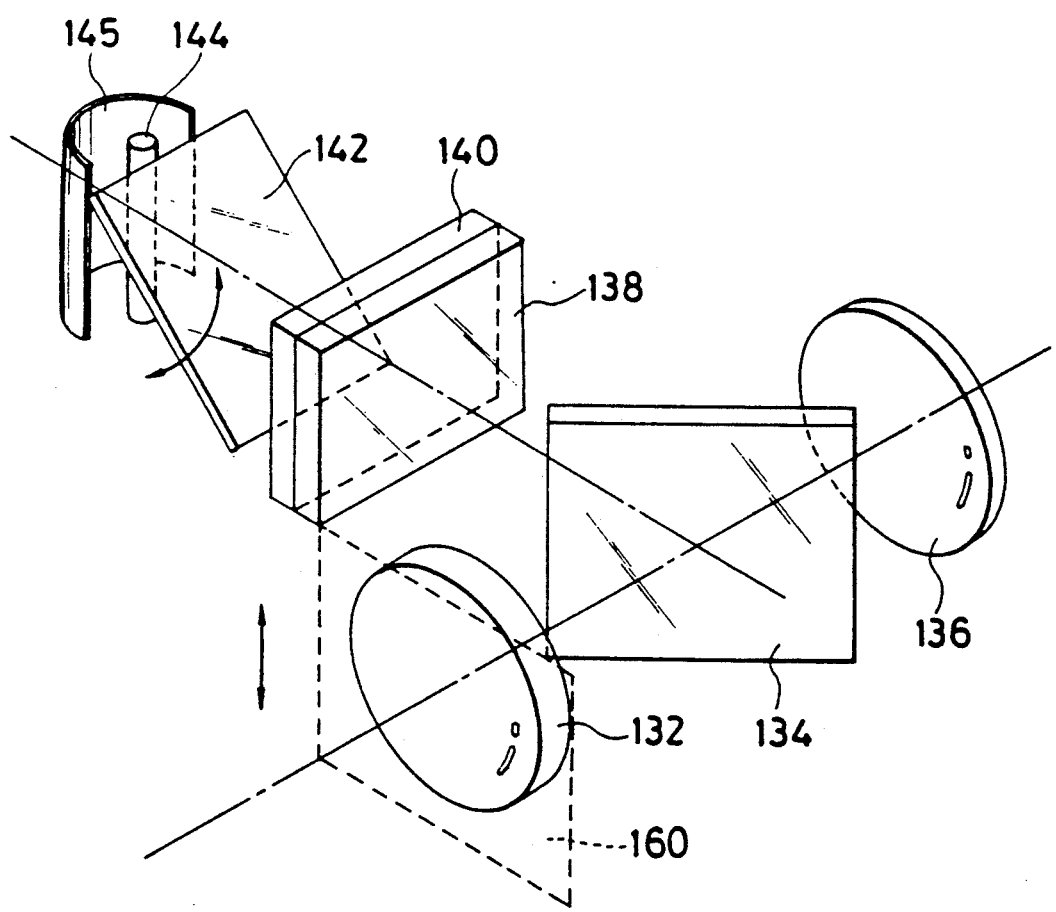
FIG. 14 is an enlarged view of main portions of a finder according to the invention.

Referring now to FIGS. 12 to 14, there is shown another embodiment of a view finder according to the invention. As shown in FIG. 13, a video camera 110 includes a taking lens part 112 and a view finder part 114. The taking lens part 112 comprises a focus lens 116, a magnification varying lens 118, a compensator lens 120 and the like. An object light emitted out from these lenses is allowed to enter an image pickup element 122, where the object light is converted to an electric signal. And, the thus photo-electrically converted object signal is applied through a signal process circuit 124 and an EVF controller 126 to be discussed later to a recording-/reproducing unit 128. In this manner, the object light can be recorded in the recording/reproducing unit 128.

The view finder part 114, as shown in FIGS. 13 and 14, includes an objective lens 132 forming an OVF 131, and, in the rear of the objective lens 132, a half mirror 134 and an eyepiece 136. And, in a direction in which the reflected light of the half mirror 134, there is arranged a transmissive liquid crystal display element 138 which forms an EVF 135. Therefore, if a light is irradiated onto the rear surface of the liquid crystal display element 138, then the irradiated light is allowed to pass through the liquid crystal display element, so that the liquid crystal display element 138 is brightened. The liquid crystal display element 138 is able to display picture images and the photographing data that is input from a character generator 139, in accordance with the output signal from an EVF driver 164.

In FIG. 13, below the liquid crystal display element 138 there is disposed a diffuse plate 140 which is capable of turning lights, which come from a lighting mirror 142 and a fluorescent tube 144, into diffused lights. Also, below the diffuse plate 140 there is disposed the lighting mirror 142 in such a manner that it can be swung between its up position (its retreat position) and its dow position (its reflect position). For this reason, when the lighting mirror 142 is at its down position, the light that is taken from a lighting window 146 shown in FIG. 12 can be totally reflected and irradiated onto the diffuse plate 140. Also, when the lighting mirror 142 is at its up position, it is retreated to a position which does not shield the light of the fluorescent tube 144 disposed in the rear of the lighting mirror 142, so that the light of the fluorescent tube 144 is irradiated onto the diffuse plate 140. Further, due to the fact that there is disposed a reflection mirror 145 downwardly of the fluorescent tube 144, the light of the fluorescent tube 144 can be collected in the direction of the diffuse tube 140.

Switching between the up and down positions of the lighting mirror 142 can be achieved by the operation of an actuator 148 provided in the lighting mirror 142. The actuator 148 can be operated by a signal from an actuator driver 150. Also, the fluorescent tube 144 can be operated by a signal from a fluorescent tube driver 152.

The above-mentioned actuator driver 150 and fluorescent tube driver 152 are arranged to be able to output operation signals respectively to the actuator 148 and fluorescent tube 144 when the signals that are output from a light quantity sensor 154 are applied through the EVF controller 126 to the actuator driver 150 and fluorescent tube driver 152. And, the light quantity sensor 154 is able to apply different signals to the EVF controller 126 when the quantity of light from the lighting window 146 is equal to or goes beyond or below the quantity of light entering from the objective lens 132.

In accordance with the signal from the light quantity sensor 154, the EVF controller 126 outputs a signal to hold the lighting mirror 142 at its down position and to turn off the fluorescent tube 144 when the quantity of light is equal to greater than the quantity of the entering light, and outputs a signal to hold the lighting mirror at its up position and to turn on the fluorescent tube 144 when the quantity of light is less than the quantity of the entering light.

In front of the objective lens 132 of the view finder part 114 there is provided a light shield plate 160 in such a manner that it is free to move in a vertical direction and also that it can be held at three positions, that is, a position to shield a light of an object to be photographed, a position not to shield the above-mentioned object light (or, a hybrid mode position), and a position to operate an EVF switch 162. The light shield plate 160 can be operated by operating a shutter button 161 shown in FIG. 12. And, if the light shield plate 160 is brought into contact with the EVF switch 162 to thereby operate the EVF switch 162, then an operation signal is applied to the EVF controller 126, so that the EVF controller 126 can apply a signal not to display any picture image to the liquid crystal display element 138 through an EVF driver 164. By means of this, a photographer is now able to see the object to be photographed only through the OVF.

Also, when the light shield plate 160 is held at other positions than the above position, then a signal to display a picture image is applied from the EVF controller 126 to the liquid crystal display element 138. For this reason, when the light shield plate 160 is situated in the hybrid mode position, the photographer is able to see the images from OVF and EVF in combination.

In FIG. 12, a reference numeral 170 designates a microphone and 172 stands for a motor-operated zoom button.

Description will be given below of the operation of the view finder constructed in the above-mentioned manner according to the invention, when it is operated in the hybrid mode.

At first, the shutter button 161 is operated to thereby set the light shield plate 160 at the hybrid mode position. At that time, since the EVF switch 162 is off, the photographer is able to view the picture image of the EVF 135 in combination with the object obtained through the OVF 131.

Therefore, if an input signal to indicate photograph data or the like is applied from the character generator 139, then the photograph data or the like can be displayed on the liquid crystal element 138 from the EVF controller 126 through the EVF driver 164. BY means of this, the photographer is able to view the photograph data or the like displayed on the liquid crystal display element 138 through the half mirror 134 and eyepiece 136, that is, the photographer is able to view various kinds of data necessary for photographing in combination with the object to be photographed.

During the above operation, the light quantity sensor 154 is sensing the quantity of the light from the lighting window 146 and the quantity of the light from the objective lens 132. When the light quantity from the lighting window 146 is found equal to or greater than the light quantity from the objective lens 132, then the light quantity sensor 154 outputs a signal to hold the lighting mirror 142 at its dow position in order to guide the light quantity from the lighting window 146 to the liquid crystal display element 138, so that the liquid crystal display element 138 is able to receive through the diffuse plate 140 a quantity of light equal to or greater than the quantity of the incident light from the objective lens 132. Therefore, due to the fact that a quantity of light almost equal to the quantity of the light from the OVF is guided to the liquid crystal display element 138, the brightness of the light image coincides with the brightness of the EVF image, so that the EVF image can be viewed more clearly.

In the above-mentioned embodiment the liquid crystal display element 138, but other display elements than the liquid crystal display element can also be used. Also, in the above embodiment the diffuse plate 140 is disposed adjacent to the liquid crystal display element 138.

However, this is not limitative, but the diffuse plate 140 may be disposed in the lighting window 146.

In FIGS. 12 to 14, the description has been given of a case in which a view finder according to the invention is used in the video camera 110. However, the invention is not limited to this, but the view finder of the invention can also be used in other cameras such as a still video camera, a silver salt camera and the like.

Figure 15:
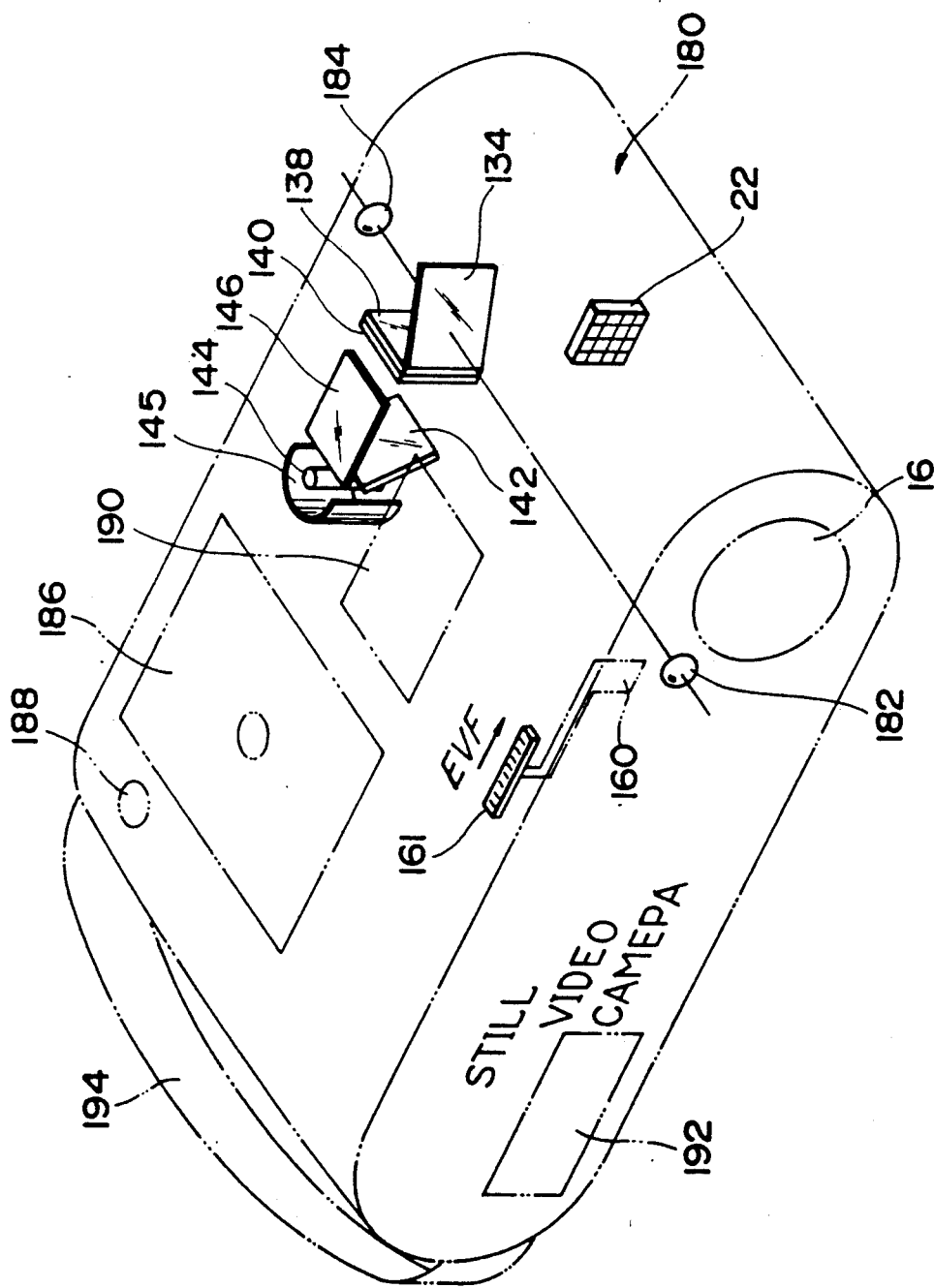
FIG. 15 is a perspective view of a still video camera incorporating therein a view finder according to the invention; and, FIGS. 16 to 19 are respectively perspective view, front view, top plan view and side view of a silver salt camera incorporating therein a view finder according to the invention; and, FIG. 20 is a general view of the structure of an embodiment of a view finder according to the invention, in which no half mirror is used.

Referring now to FIG. 15, there is shown a perspective view of a still video camera to which a view finder according to the invention is applied. In FIG. 15, the same or similar parts as in FIGS. 12 to 14 are given the same designations and the description thereof is omitted here.

In FIG. 15, a still video camera 180 includes a half mirror 134 on the optical axis of an objective lens 182 for OVF and an eyepiece 184 for OVF, and, on the left of the half mirror 134, a liquid crystal display element 138 and a diffuse plate 140. The still video camera 180 includes, in the rear of the diffuse plate 140, a lighting mirror 142, a fluorescent tube 144 and a reflecting mirror 145. Upwardly of the lighting mirror 142 there is disposed a lighting window 146. Also, the still video camera 180 includes a shutter button 161 in the front end portion thereof.

A light shield plate 160 is connected to the shutter button 161. The light shield plate 160 is able to abstract an EVF switch 162 (see FIG. 13) by operating the shutter button 161. These parts have the same structure as those provided in the previously-described video camera 110 in connection with FIG. 13.

In FIG. 15, reference character 16 designates a taking lens, 22 stands for a CCD, 186 represents a still video drive, 188 expresses a release button, 190 indicates a state display monitor, 192 points out a flash window, and 194 stands for a strap.

Figure 16:
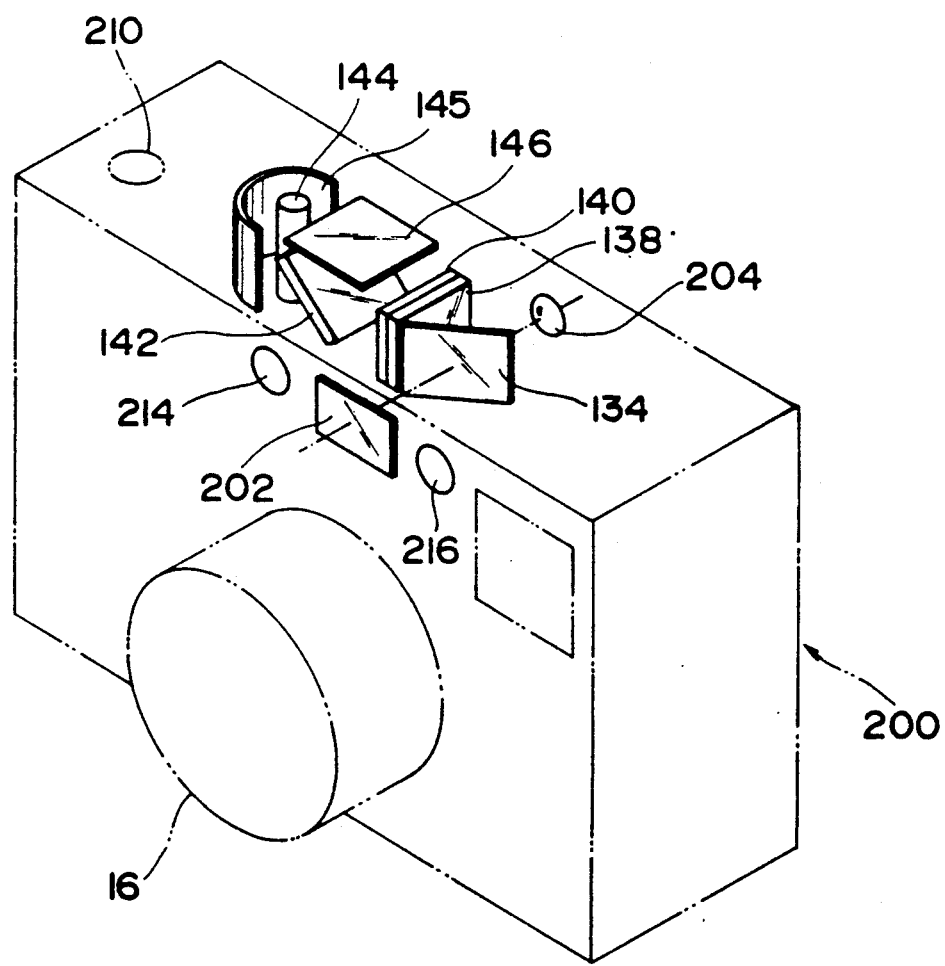

Referring now to FIG. 16, there is shown a perspective view of a silver salt camera 200 to which a view finder according to the invention is applied. In FIG. 16, a half mirror 134 is disposed on the optical axis of an objective lens 202 for the view finder of the silver salt camera 200 and an eyepiece 204 for the view finder of the silver salt camera 200. Other parts for the view finder are arranged with respect to a half mirror in a similar manner to those in the Previously described video camera 110 and still video camera 180.

Figure 17:
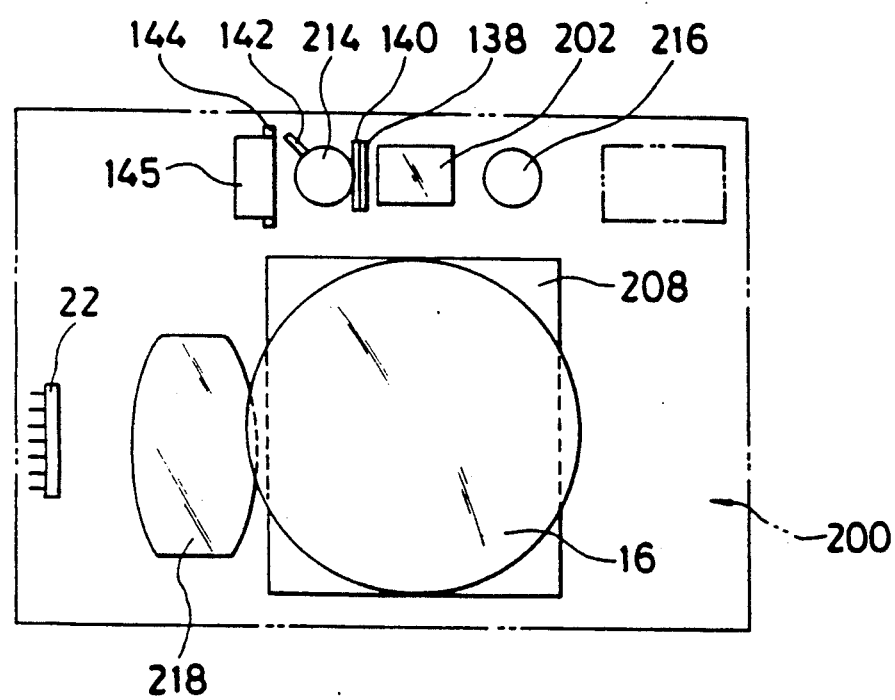
Figure 18:
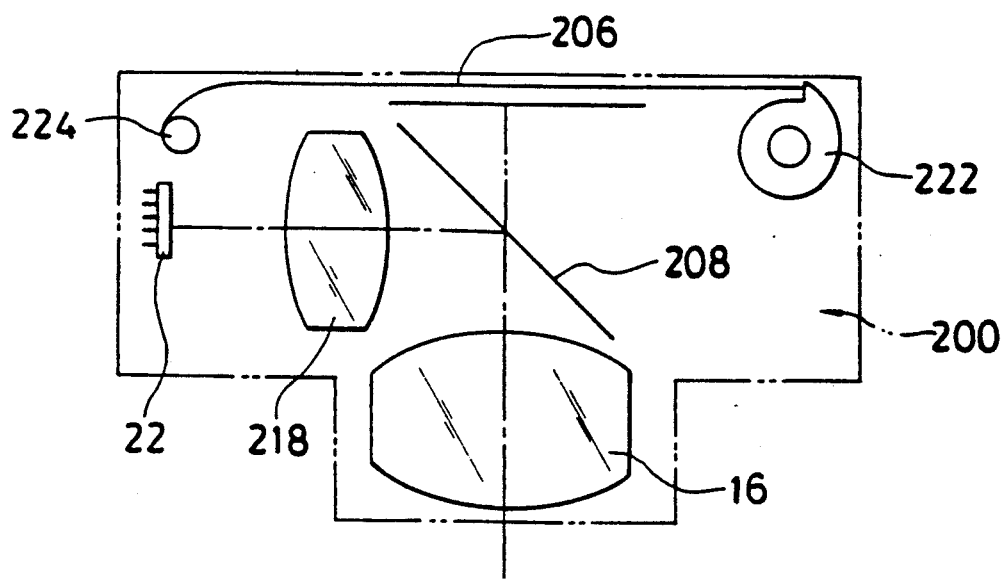
Figure 19:
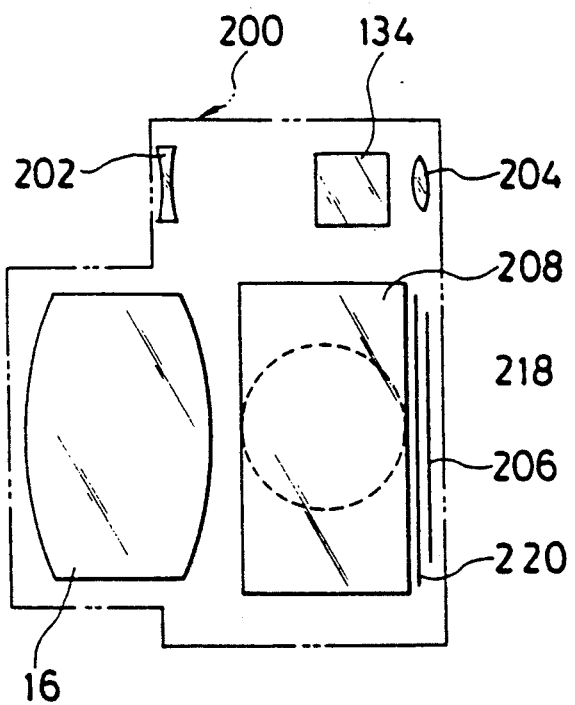

The silver salt camera 200 is different from the video camera 110 and still video camera 180 in that it records an object to be photographed in a film surface 206 (see FIGS. 18 and 19). For this reason, a CCD 22 to be used in the EVF finder is, as shown in FIGS. 17 to 19, disposed on the side portion of the silver salt camera 200, and the light of the object to be photographed from the taking lens 16 is guided through the half mirror 208 to the CCD 22 and the film surface 206.

In FIG. 16, reference numeral 210 designates a release button, 212 stands for a flash, and 214, 216 respectively represent an AF light projecting part and an AF light receiving part. And, in FIGS. 17 to 19, numeral 218 stands for a CCD lens and 220 designates a shutter. Also, in FIG. 18, 222 designates a cartridge and 224 stands for a winding shaft.

In the above embodiment, the half mirror is used to realize a hybrid of the OVF and EVF. However, if the finder is constructed in such a manner as shown in FIGS. 20 to 24, then the hybrid of the CVF and EVF can also be realized without using the half mirror.

Figure 20:
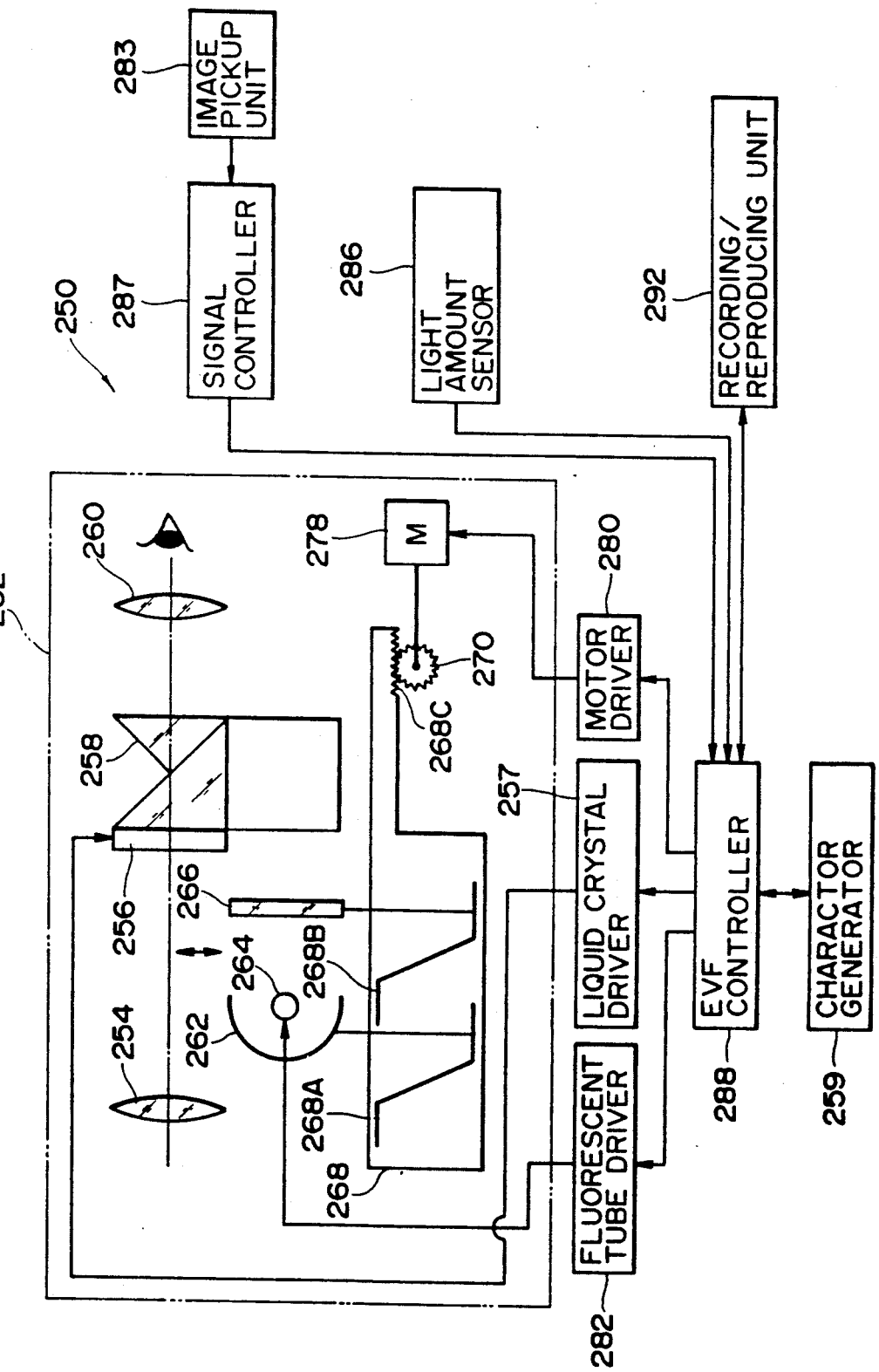

In FIG. 20, there is shown a block diagram of this finder. As shown in FIG. 20, a video camera 250 comprises a view finder part 252 which in turn includes an objective lens 254. A light transmissive liquid crystal display element 256 is disposed downstream of the objective lens 256, that is, at the focus position of the objective lens 256. The liquid crystal display element 256 is capable of displaying picture images input from an image pickup unit 283 and a signal controller 287, photographing data input from a character generator 259, and the like, in accordance with a signal output from a liquid crystal driver 257.

Figure 21:
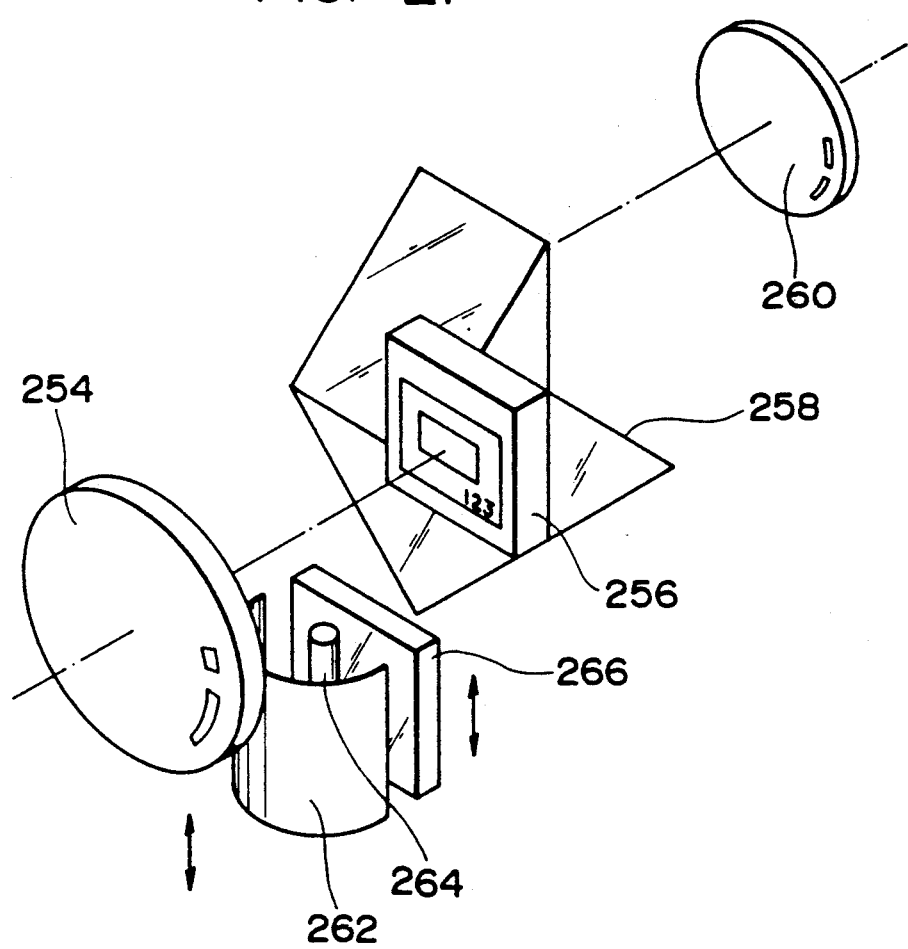
FIGS. 21 and 22 are respectively enlarged views of the main portions of the above embodiment shown in FIG. 20; and, FIGS. 23 and 24 are respectively side views of another embodiments of a view finder according to the invention.
Figure 22:
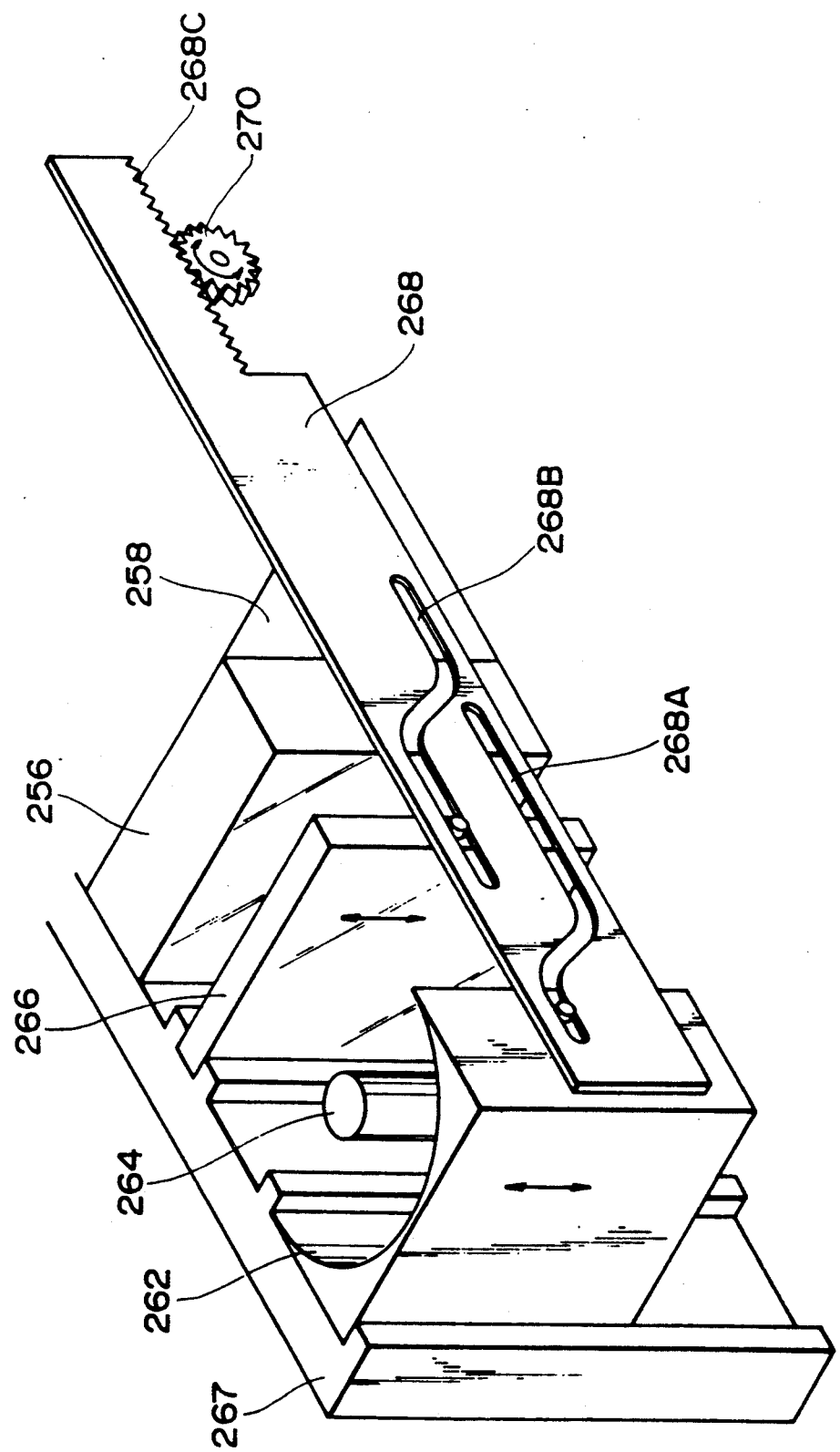

Also, downstream of the liquid crystal display element 256, as shown in FIG. 21, there are disposed a porro-prism 258 and an eyepiece 260. And, between the objective lens 254 and the light transmissive liquid crystal display element 256, there are interposed a reflecting mirror 262, a fluorescent tube 264 and a diffuse plate 266 in such a manner that they are free to move in a direction of an arrow shown in FIG. 21. In other words, as shown in FIG. 22, the reflecting mirror 262 and fluorescent tube 264 are respectively connected to a cam groove 268A formed in a plate cam 268, and the diffuse plate 266 is connected to a cam groove 268B formed in the plate cam 268. Further, the reflecting mirror 262 and fluorescent tube 264 as well as the diffuse plate 266 are respectively provided in a guide plate 267 in such a manner that they are free to move in a direction of arrows shown in FIG. 22.

On the other hand, the plate cam 268 is connected through a rack 268C and a pinion 270 to a motor 278. Due to this, if the motor is driven, then the reflecting mirror 262, fluorescent tube 264 and diffuse plate 266 are moved in the arrow direction in FIG. 20. The motor 278 can be operated by a signal output from a motor driver 280. The fluorescent tube 264 can be controlled or turned on and off by a signal from a fluorescent tube driver 282.

Also, when a signal output from a light amount sensor 286 is applied thereto through an EVF controller 288, then the motor driver 280 and fluorescent tube driver 282 output operation signals to the motor 278 and fluorescent tube 264, respectively. And, when a lighting amount is equal to or greater than and is smaller than the amount of light entering from the objective lens 132, then the light amount sensor 286 is able to apply different signals to the EVF controller 288. Also, in the illustrated embodiment the fluorescent tube 264 and diffuse plate 266 are arranged such that they can be moved together. However, this is not limitative, but they can be arranged such that they can be moved individually. Due to this, for example, when the outside is light, the diffuse plate 266 can be disposed in front of the liquid crystal display element 256. Referring to Table 1, there are shown the operation states of the liquid crystal display element 256, fluorescent tube 264 and diffuse plate 266.

In FIG. 20, reference numeral 292 designates a recording/reproducing unit into which a signal of the object to be photographed is applied through the EVF controller 288.

|  | LIQUID CRYSTAL UNIT | DIFFUSE PLATE | FLUORESCENT TUBE UNIT |
| --- | --- | --- | --- |
| ① When EVF is used | MONITOR | IN | OUT |
| (the outside is light) | | | |
| ② When EVF is used | MONITOR | IN | IN |
| (the outside is dark) | | | |
| ③ Hybrid Operation | HYBRID MODE | OUT | OUT |
| ④ When OVF is used | OFF | OUT | OUT |

In the embodiment shown in FIGS. 20 to 22, description has been given of a case where the porro-prism 258 is employed but, however, the invention can also apply to a finder which does not use the porro-prism 258, as shown in FIGS. 23 and 24. In FIG. 23, there is illustrated a state in which the light transmissive liquid crystal element 256 is disposed in front of a second field lens. And, in FIG. 24, there is illustrated a state in which the light transmissive liquid crystal element 256 is disposed in front of a first field lens. In this case, the liquid crystal display element 256 is disposed at focus positions F1 and F2 shown in FIGS. 23 and 24, respectively.

Here, in FIGS. 23 and 24, reference numeral 304 designates an objective lens, 306 stands for a relay lens, and 308 represents an eyepiece.

In the above-mentioned embodiments the light transmissive liquid crystal element 256 is fixed. However, the invention is not limited to this, but the liquid crystal display element 256 may be movable similarly to the reflecting mirror 262, fluorescent tube 264 and diffuse plate 266.

As has been described heretofore, in accordance with a finder according to the invention, since the EVF can be combined with the OVF and the like and the combination thereof can be selected according cases, the EVF can be used, for example, in reproduction or in monitoring, and the OVF and the like can be used in photographing to thereby be able to obtain a clear picture image, and at the same time a photographing range can be indicated in a simple structure comprising the combination of the OVF with the EVF without using a zoom type OVF.

Also, in accordance with a view finder according to the invention, the brightness of an image displayed on the liquid crystal display part can be set so as to be equal to the brightness of an optical image displayed on the optical finder or the like with no provision of a special electric circuit which is adapted to vary the brightness of the EVF. For this reason, the photographing data and the like of the liquid crystal display part can be displayed clearly on the view finder in combination with the optical image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A view finder apparatus comprising:
    an eyepiece;
    a half mirror;

optical view finder means for guiding a light coming from an object to be photographed to said eyepiece through said half mirror; and electrical view finder means, for displaying at least one of a video signal obtained by photoelectrically converting said light from said object and various photographic information on a display means, and for guiding a display image of said display means to said eyepiece through said half mirror, further including:

a shutter means for opening and closing the optical path of the light of said optical view finder means entering said half mirror; and, an EVF switch for enabling the operation of said electrical view finder means when the optical path of said optical view finder means is closed by said shutter means, and for disabling the operation of said electrical view finder means when the optical path of said optical view finder means is opened by said shutter means, wherein said shutter means is composed of a liquid crystal shutter.

2. A view finder apparatus comprising:
an eyepiece;
a half mirror;
optical view finder means for guiding light coming from an object to be photographed to said eyepiece through said half mirror; and,
electrical view finder means, for displaying at least one of a video signal obtained by photoelectrically converting said light from said object and various photographic information on a display means, and for guiding a display image of said display means to said eyepiece through said half mirror, further including:
means for detecting the focal distance of a taking lens;
means for detecting an object distance;
means for finding the position and size of a picture frame in according with said detected focal distance and object distance; and
means for allowing said display means of said electrical view finder means to display said found picture frame.

3. A view finder apparatus comprising:
an eyepiece;
a half mirror;
optical view finder means for guiding a light coming from an object to be photographed to said eyepiece through said half mirror; and,
electrical view finder means, for displaying at least one of a video signal obtained by photoelectrically converting said light from said object and various photographic information on a display means, and for guiding a display image of said display means to said eyepiece through said half mirror, further including:
means for thinning out picture image data from picture image data obtained by converting said video signal from analog to digital at a predetermined rate;
means for allotting each of said thinned-out picture image data to a predetermined position of a field memory; and,
means for allowing said display means of said electrical view finder means to display the images of said object reduced in accordance with the picture image data of said field memory allotted to said predetermined position.

4. A view finder apparatus comprising:
an eyepiece;
a half mirror;
optical view finder means for guiding alight coming from an object to be photographed to said eyepiece through said half mirror; and,
electrical view finder means, for displaying at least one of a video signal obtained by photoelectrically converting said light from said object and various photographic information on a display means, and for guiding a display image of said display means to said eyepiece through said half mirror, wherein said various photographic information comprises a counter display state; a residual quantity of a battery; the brightness state of a measuring area; photographing date, month and year; a recording state; and a title display state.

5. A view finder apparatus comprising:
an eyepiece;
a half mirror;
optical view finder means for guiding a light coming from an object to be photographed to said eyepiece through said half mirror; and,
electrical view finder means, for displaying at least one of a video signal obtained by photoelectrically converting said light from said object and various photographic information on a display means, and for guiding a display image of said display means to said eyepiece through said half mirror, wherein said display means of said electrical view finder means includes:
transmissive display means; and
external light entrance allowing means for allowing entrance of an external light diffused from the back surface of said transmissive display means.

6. An apparatus as set forth in claim 5, wherein said transmissive display means is a transmissive liquid crystal display element.

7. An apparatus as set forth in claim 5 wherein said external light entrance allowing means comprises a lighting window for taking in an external light and a rotatable reflecting mirror for guiding said external light taken in from said lighting window to the back surface of said display means.

8. An apparatus as set forth in claim 7, wherein a light emitting means is disposed in the rear of said reflecting mirror and also wherein, if said reflecting mirror is rotatively moved to a position in which said external light is not guided to the back surface of said transmissive display means, then the light of said light emitting means is guided to the back surface of said transmissive display means.

9. A view finder as set forth in claim 8, wherein said reflecting mirror includes rotating means and said rotating means rotatively moves said reflecting mirror to a position to guide the light of said light emitting means to the back surface of said transmissive display means when the quantity of said external light is less than a predetermined light quantity.

10. An apparatus as set forth in claim 5, further including a diffusion plate, and a mechanism for putting said diffusion plate into the back of said electrical view finder means and drawing said diffusion plate out of said back of said electrical view finder means.

11. An apparatus as set forth in claim 5, further including light emitting means for emitting a milk white light, and a mechanism for putting said light emitting means into the back of said electrical view finder means and drawing said light emitting means out of said back of said electrical view finder means.

* * * * *